United States Patent [19]

Kopatz et al.

[11] Patent Number: 4,781,753

[45] Date of Patent: * Nov. 1, 1988

[54] PROCESS FOR PRODUCING FINE SPHERICAL PARTICLES FROM NON-FLOWING POWDERS

[75] Inventors: Nelson E. Kopatz; Lori S. Pruyne, both of Sayre, Pa.

[73] Assignee: GTE Products Corporation, Stamford, Conn.

[*] Notice: The portion of the term of this patent subsequent to Dec. 8, 2004 has been disclaimed.

[21] Appl. No.: 8,495

[22] Filed: Jan. 29, 1987

[51] Int. Cl.$^4$ ............................................. B22F 1/00
[52] U.S. Cl. ................................. 75/0.5 B; 219/121.73
[58] Field of Search ............ 75/0.5 B, 0.5 BA, 0.5 R, 75/0.5 BB, 10.19, 10.22; 264/15, 10; 219/121 PB

[56] References Cited

U.S. PATENT DOCUMENTS

| | | |
|---|---|---|
| 3,652,259 | 3/1972 | Knopp ................................. 75/0.5 B |
| 3,974,245 | 8/1976 | Cheney et al. ...................... 75/0.5 B |
| 4,264,354 | 4/1981 | Cheetham .......................... 75/0.5 B |
| 4,569,693 | 2/1986 | Albrecht et al. ...................... 75/252 |
| 4,711,660 | 12/1987 | Kemp ................................. 75/0.5 B |
| 4,711,661 | 12/1987 | Kemp ................................. 75/0.5 B |

Primary Examiner—Christopher W. Brody
Attorney, Agent, or Firm—Donald R. Castle; L. Rita Quatrini

[57] ABSTRACT

A process is disclosed for producing fine spherical powder particles. The process involves forming a relatively uniform admixture of a starting powder material and a flowability aid, the flowability aid being non-reactive with and coarser than the starting material, entraining the admixture in a carrier gas and passing the admixture through a high temperature zone at a temperature above the melting point of the starting material to melt at least about 50% by weight of the starting material, resolidifying the resulting high temperature treated material, and separating the flowability aid from the balance of the high temperature treated material.

1 Claim, No Drawings

PROCESS FOR PRODUCING FINE SPHERICAL PARTICLES FROM NON-FLOWING POWDERS

This invention relates to a high temperature process for producing spherical particles from non-flowing material. The non-flowing material is processed with a flowability aid which results in faster feed rates of the powder through the process. More particularly, the high temperature process is a plasma process and the starting material is very fine and non-spherical.

BACKGROUND OF THE INVENTION

U.S. Pat. No. 3,909,241 to Cheney et al relates to free flowing powders which are produced by feeding agglomerates through a high temperature plasma reactor to cause at least partial melting of the particles and collecting the particles in a cooling chamber containing a protective gaseous atmosphere where the particles are solidified.

Fine spherical metal particles are useful in applications such as filters, precision press and sinter parts, and injection molded parts.

Some of the better commercial processes for producing such metal powder particles are by gas or water atomization. Only a small percentage of the powder produced by atomization is less than about 20 microns. Therefore, yields are low and metal powder costs are high as a result.

In European Patent Application No. WO8402864 published Aug. 2, 1984, there is disclosed a process for making ultra-fine powder by directing a stream of molten droplets at a repellent surface whereby the droplets are broken up and repelled and thereafter solidified as described therein. While there is a tendency for spherical particles to form after rebounding, it is stated that the molten portion may form elliptical shaped or elongated particles with rounded ends.

SUMMARY OF THE INVENTION

In accordance with one aspect of this invention, there is provided a process for producing fine spherical powder particles. The process involves forming a relatively uniform admixture of a starting powder material and a flowability aid, the flowability aid being non-reactive with and coarser than the starting material, entraining the admixture in a carrier gas and passing the admixture through a high temperature zone at a temperature above the melting point of the starting material to melt at least about 50% by weight of the starting material, resolidifying the resulting high temperature treated material, and separating the flowability aid from the balance of the high temperature treated material.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The starting powders of this invention from which the fine spherical particles are to be made, can be in actuality any type of powder that is high temperature processed, particularly plasma processed. Such powders include metal powders, metal alloy powders, ceramics, glasses, or combinations of these.

A relatively uniform admixture is formed of the starting material and an flowability aid which is non reactive with the starting material. The size of the flowability aid must be larger than that of the starting material. The preferred flowability aid is aluminum oxide.

The starting material is generally less than about 20 microns in diameter, more typically less than about 10 microns in diameter, and can be less than about 5 microns in diameter. The particle size of the flowability aid is typically from about 70 to about 150 microns in diameter.

The starting material and flowability aid are blended by any standard powder mixing method. The relative amounts of starting material and flowability aid can be any amounts, but most typically, equal weight parts of starting material and flowability aid are used.

The resulting admixture is then entrained in a carrier gas such as argon and passed through a high temperature zone at a temperature above the melting point of the starting material for a sufficient time to melt at least about 50% by weight of the starting material and form spherical particles of the melted portion of starting material. Some additional particles can be partially melted or melted on the surface and these can be spherical particles in addition to the melted portion. The preferred high temperature zone is a plasma.

Details of the principles and operation of plasma reactors are well known. The plasma has a high temperature zone, but in cross section the temperature can vary typically from about 5500° C. to about 17,000° C. The outer edges are at low temperatures and the inner part is at a higher temperature. The retention time depends upon where the particles entrained in the carrier gas are injected into the nozzle of the plasma gun. Thus, if the particles are injected into the outer edge, and retention time must be longer, and if they are injected into the inner portion, the retention time is shorter. The residence time in the plasma flame can be controlled by choosing the point at which the particles are injected into the plasma. Residence time in the plasma is a function of the physical properties of the plasma gas and the powder material itself for a given set of plasma operating conditions and powder particles. Larger particles are more easily injected into the plasma while smaller praticles tend to remain at the outer edge of the plasma jet or are deflected away from the plasma jet.

As the material passes through the plasma and cools, it is rapidly solidified.

The flowability aid is then separated from the balance of the resulting high temperature treated material. This is done typically by classifying the high temperature treated material to remove the flowability aid. Out of size or shape material are also removed by classification in order that the desired size of spherical powder material can be obtained.

The classification can be done by standard techniques such as screening or air classification. The unmelted minor portion of the high temperature treated material can then be reprocessed according to the invention.

With a flowability aid, the feed rate of material through the high temperature process is higher than when the process is carried out without the flowability aid. Use of a flowability aid in the process of the present invention results in at least a two fold increase in feed rate, and most typically in an average increase of about 500%. As an example, the feed rate can be increased from as low as about 0.1 lbs/hr (without the presence of the flowability aid) to as high as about 4 lbs/hr when the improvement of this invention is practiced. It is to be understood that the feed rates given refer to the feed rates of the starting material per se as opposed to the feed rate of the mixture of starting material and flowability aid. For example, in a mixture of equal weight parts of starting material and flowability aid, if the feed rate of the mixture is about 4 lbs/hr, the feed rate of the starting material itself would be half that value by virtue of its content in the mixture, or about 2 lbs/hr.

By the process of this invention, fine non-spherical powder particles which are generally difficult to feed through a high temperature process, are able to be fed to such processes at increased feed rates and without plugging the equipment such as a plasma gun nozzle in a plasma process. The particle size of the spherical particles thus produced is essentially the same as that of the starting material.

To more fully illustrate this invention, the following non-limiting examples are presented.

EXAMPLE 1

Iron based alloy powder is milled to a particle size of less than about 20 microns in diameter and then mixed with an equal amount by weight of aluminum oxide powder as a flowability aid having a particle size in the range of from about 70 to about 150 microns in diameter. The material passes through a plasma at a feed rate of about 3 lbs/hr as opposed to a feed rates of less than about 0.1 lbs/hr when the material is processed without the aluminum oxide.

EXAMPLE 2

Soda lime glass powder is milled to a particle size of less than about 10 microns in diameter and then mixed with an equal amount by weight of aluminum oxide powder having a particle size in the range of from about 70 to about 150 microns in diameter. The material passes through a plasma at a feed rate of about 4 lbs/hr as opposed to a feed rate of less than about 2 lbs/hr when the material is processed without the aluminum oxide.

While there has been shown and described what are at present considered the preferred embodiments of the invention, it will be obvious to those skilled in the art that various changes and modifications may be made therein without departing from the scope of the invention as defined by the appended claims.

What is claimed is:
1. A process for producing fine spherical powder particles, said process comprising:
   (a) forming a relatively uniform admixture of a starting powder material having a particle size of no greater than about 20 micrometers in diameter and a flowability aid, said flowability aid being nonreactive with and coarser than said starting material;
   (b) entraining said admixture in a carrier gas and passing said admixture through a high temperature zone at a temperature above the melting point of said starting material, said temperature being from about 5500° C. to about 17,000° C., said temperature being created by a plasma jet, to melt at least about 50% by weight of said starting material;
   (c) rapidly and directly resolidifying the resulting high temperature treated material, while in flight to form fine spherical particles having a particle size of less than about 20 micrometers in diameter; and
   (d) separating said flowability aid from the balance of said high temperature treated material.

* * * * *